United States Patent [19]

Minamida et al.

[11] Patent Number: 4,549,278
[45] Date of Patent: Oct. 22, 1985

[54] COMBINATORIAL WEIGHING METHOD AND APPARATUS

[75] Inventors: Kazukiyo Minamida; Setsuo Haze, both of Shiga, Japan

[73] Assignee: Kabushiki Kaisha Ishida Koki Seisakusho, Kyoto, Japan

[21] Appl. No.: 351,959

[22] Filed: Feb. 24, 1982

[30] Foreign Application Priority Data

Feb. 25, 1981 [JP] Japan .................................. 56-27204

[51] Int. Cl.$^4$ ...................... G01G 19/04; G01G 23/22
[52] U.S. Cl. ........................................ 364/567; 177/25
[58] Field of Search ............... 364/403, 466, 567, 568; 73/1 B, 4 D; 177/52, 57, 25; 377/22

[56] References Cited

U.S. PATENT DOCUMENTS

| | | | |
|---|---|---|---|
| 3,939,928 | 2/1976 | Murakami et al. ..................... | 177/1 |
| 4,157,738 | 6/1979 | Nishiguchi ........................... | 364/567 |
| 4,267,894 | 5/1981 | Hirano et al. ....................... | 364/567 |
| 4,344,492 | 8/1982 | Hirano .................................. | 177/25 |
| 4,367,070 | 11/1982 | Hirano .................................. | 177/25 |
| 4,385,671 | 5/1983 | Hirano .................................. | 177/25 |

*Primary Examiner*—James D. Thomas
*Assistant Examiner*—Dale M. Shaw
*Attorney, Agent, or Firm*—Staas & Halsey

[57] ABSTRACT

A combinatorial weighing or counting method and apparatus in which a plurality of articles are weighed to provide a plurality of weight values, or to provide a plurality of discrete numbers found from the weight values, the weight values or numbers are combined, and the optimum combination thereof is found whose sum is equal or closest to a set target value. In the inventive weighing method and apparatus, (1) the purality of weight values are divided into a plurality of groups, (2) there are computed summed weight values for each group by adding the weight values in each and every combination of weight values that constitute the group, (3) every combination of the summed weight values in which single summed weight value is permitted to be selected from each group, is searched, (4) the difference is computed between the set target value and a total weight value obtained by adding the summed weight values in each and every combination of the summed weight values, and (5) the combination of summed weight values whose sum gives the smallest difference is regarded as the optimum combination.

15 Claims, 10 Drawing Figures

COMBINATORIAL WEIGHING METHOD AND APPARATUS

BACKGROUND OF THE INVENTION

This invention relates to a method and apparatus for executing a combinatorial weighing or counting operation and, more particularly, to a combinatorial weighing or counting method and apparatus for shortening the time necessary for arithmetic computations.

A weighing or counting apparatus to which the present invention appertains performs combinatorial arithmetic operations on a plurality of weight values obtained by weighing articles by means of a plurality of weighing machines, or on a plurality of discrete numerical values obtained by dividing the weight values by the weight of an individual article, and obtains the combination of weights or discrete values whose sum is equal or closest to a set target value. With a combinatorial weighing or counting apparatus of this type, all possible combinations of the obtained weight values, or all possible combinations of the discrete numerical values, are added to give a plurality of summed combinations from which the single combination whose sum is equal or closest to the set target value must be selected. Assume that there are ten weighing machines employed in the apparatus. This means that the total number of possible weight value or discrete value combinations would be 1023. With the prior-art method, it would be necessary to perform 1023 addition operations to add all possible combinations, 1023 subtraction operations to subtract each of the 1023 summed combinations from the set target value, and the same number of selection operations to select the combination whose sum is equal or closest to the set target value. It can be appreciated that a considerable period of time would be necessary to find the desired combination.

Another disadvantage encountered in the conventional weighing or counting method is that a large number of results, from both the addition and subtraction operations, need to be stored together with the various combinations. This requires a memory having a very large storage capacity.

BRIEF SUMMARY OF THE INVENTION

Accordingly, an object of the present invention is to provide a combinatorial weighing method and apparatus which enables an optimum combination to be found with a greatly reduced number of required addition operations and in a much shorter amount of time.

Another object of the present invention is to provide a combinatorial weighing method and apparatus which enables the selection of the optimum combination that gives a total weight or total number closest to a set target value within a predetermined range of weights or numbers.

Still another object of the present invention is to provide a combinatorial weighing method and apparatus for selecting the optimum combination that gives a total weight or total number closest to a set target value within a predetermined range of weights or numbers, which method and apparatus enables the optimum combination to be found with a greatly reduced number of required addition and subtraction operations and in a much shorter amount of time.

A further object of the present invention is to provide a combinatorial weighing method and apparatus which enables a reduction in the required memory storage capacity.

A combinatorial weighing or counting method and apparatus in which a plurality of articles are weighed to provide a plurality of weight values, or to provide a plurality of discrete numbers found from the weight values, the weight values or numbers are combined, and the optimum combination thereof is found whose sum is equal or closest to a set target value. In the inventive weighing method and apparatus, (1) the plurality of weight values are divided into a plurality of groups, (2) there are computed summed weight values for each group by adding the weight values in each and every combination of weight values that constitute the group, (3) every combination of the summed weight values in which a single summed weight value is permitted to be selected from each group, is searched, (4) the difference is computed between the set target value and a total weight value obtained by adding the summed weight values in each and every combination of the summed weight values, and (5) the combination of summed weight values whose sum gives the smallest difference is regarded as the optimum combination.

Other features and advantages of the invention will be apparent from the following description taken in conjunction with the accompanying drawings.

DESCRIPTION OF THE PREFERRED EMBODIMENTS

Figure 1:
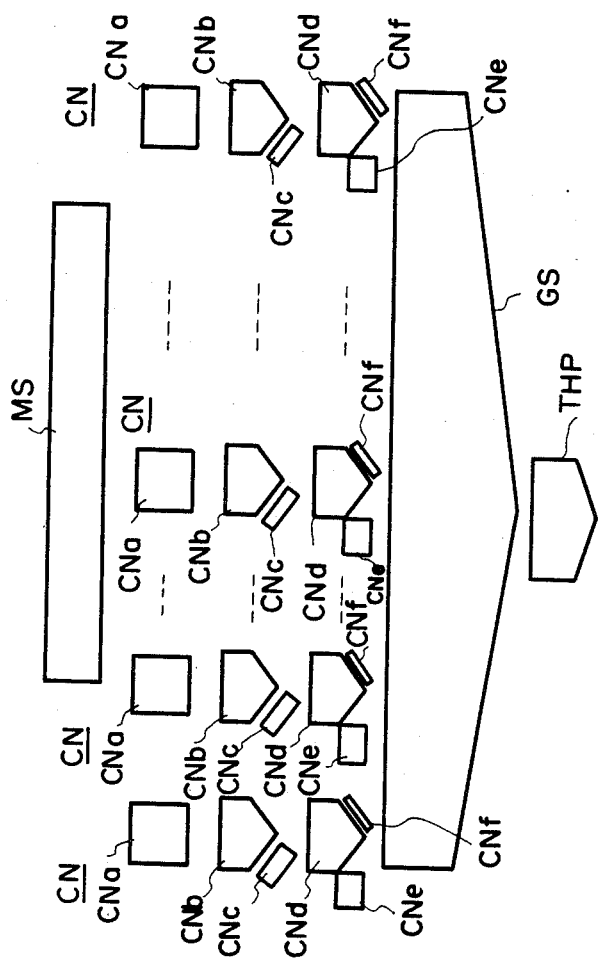
FIG. 1 is a schematic view for explaining the operating principle of a weighing apparatus which relies upon a combinatorial scale.

Referring first to FIG. 1, MS denotes a main feeder of vibratory conveyance type. Articles to be weighed, which will be referred to hereinafter merely as "articles", are introduced into the main feeder MS and are imparted with vibratory motion so as to be dispersed radially outward from the center of the main feeder. CN, CN, . . . denote n-number of weighing sections which are arranged around the main feeder MS along radially extending lines to receive the articles dispersed by the main feeder. Each weighing section CN includes a dispersing feeder $CN_a$, a holding vessel $CN_b$, a holding vessel gate $CN_c$, a weighing hopper $CN_d$, a weight sensor $CN_e$, and a weighing hopper gate $CN_f$. The dispersing feeder $CN_a$ comprises an independently vibratable conveyance device for feeding the articles by means of vibration, or an independently operable shutter device for delivering the articles in batches. In either case, each dispersing feeder $CN_a$ is so arranged that the articles received from the centrally located main feeder MS can be introduced into the corresponding holding vessel $CN_b$ disposed therebelow. The holding vessel gate $CN_c$ is provided on each holding vessel $CN_b$ in such a manner that the articles received in the holding vessel are released into the weighing hopper $CN_d$ when the gate $CN_c$ is opened. Each weight sensor $CN_e$ is attached to the corresponding weighing hopper $CN_d$ and is operable to measure the weight of the articles introduced into the weighing hopper. The weight sensor $CN_e$ is adapted to supply a combination control unit (not shown) with an electrical signal indicative of the measured weight. The combination control unit then selects the optimum combination of articles that gives a total weight closest to a target weight. Each of the weighing hopper gates $CN_f$ is provided on the corresponding weighing hopper $CN_d$. The combination control unit, upon receiving the signals from each of the weight sensors $CN_e$, responds by opening the weighing hopper gates $CN_f$ only of those weighing hoppers $CN_d$ that will give the optimum combination of articles, as mentioned above. The articles from the weighing hoppers $CN_d$ selected in this manner fall through the open weighing hopper gates and are discharged into a common collecting chute GS where they are collected together. The collecting chute GS has the shape of a funnel and is so arranged as to receive the articles from any of the circularly arrayed weighing hoppers $CN_d$ via the hopper gates, which are located above the funnel substantially along its outer rim. The articles received by the collecting chute GS are collected at the centrally located lower end thereof by falling under their own weight or by being forcibly shifted along the inclined wall of the funnel by a mechanical scraper or the like, which is not shown. The collecting chute GS is provided with a timing hopper THP at the lower end thereof for temporarily holding the collected articles. The arrival of an externally applied signal from a packing device or the like causes the timing hopper THP to release the retained articles from the weighing apparatus, namely from collecting chute GS which constitutes the lowermost stage of the apparatus, to a separate item of equipment, such as the packing device.

The operation of the arrangement shown in FIG. 1 will now be described in greater detail. As already mentioned, when the weighing hoppers which give the optimum combination are selected by the combination control unit, the weighing hopper gates $CN_f$ of those weighing hoppers are opened to deliver the articles to the collecting chute GS. This will leave the selected weighing hoppers $CN_d$ empty. Now the holding vessel gates $CN_c$ of those holding vessels $CN_b$ corresponding to the empty weighing hoppers $CN_d$ are opened to introduce a fresh supply of the articles into said weighing hoppers, leaving said holding vessels empty. Next, the dispersing feeders $CN_a$ which correspond to the empty holding vessels $CN_b$ are vibrated for a predetermined period of time to deliver a fresh supply of the articles to said holding vessels. This restores the weighing apparatus to the initial state to permit resumption of the control operation for selecting the optimum weight combinations in the manner described. Thus, weighing by the combinatorial scale may proceed in continuous fashion by repeating the foregoing steps.

Figure 2:
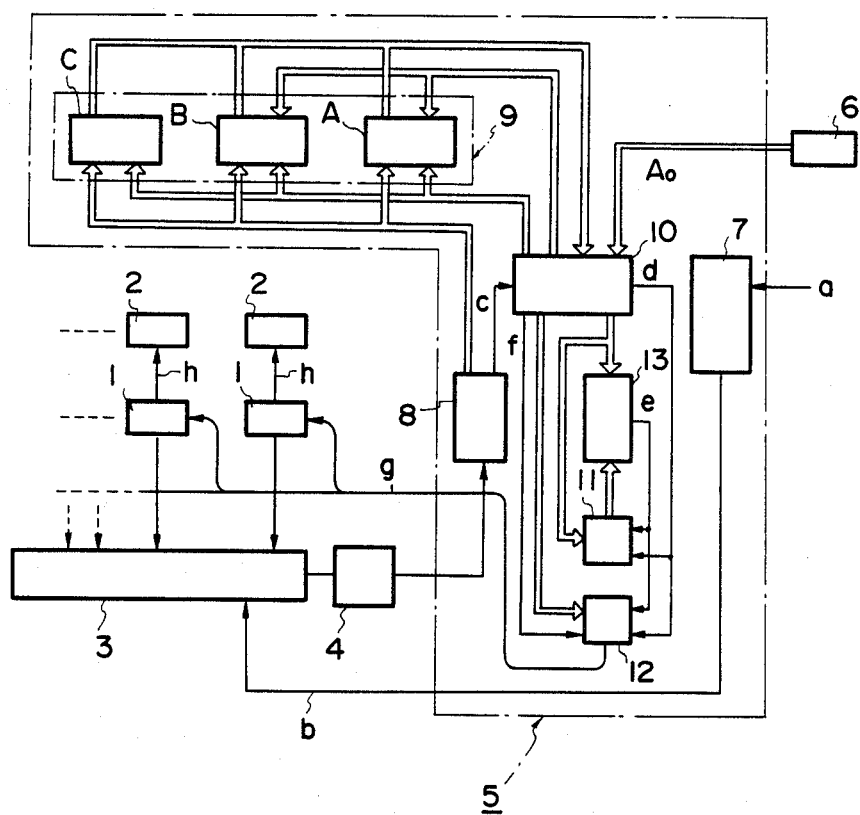
FIG. 2 is a block diagram of a weighing apparatus for practicing a weighing method according to the present invention.

FIG. 2 is a block diagram showing the basic construction of the present invention. There are provided a plurality of weighing machines 1, 1 ... which correspond to the weighing hoppers $CN_d$ shown in FIG. 1. A plurality of feeders 2, 2 ..., which correspond to the holding vessels $CN_b$ of FIG. 1, supply corresponding ones of the weighing machines 1, 1 ... with the articles. An analog multiplexer 3 receives in the form of analog quantities, the values weighed by the weighing machines 1, 1 ..., and is adapted to deliver selectively only one of these values at a time. An A/D conversion unit 4 converts the analog quantity from the multiplexer 3 into a digital quantity for delivery to a control unit 5 which may comprise a microcomputer. Also provided is a weight setting unit 6 for setting the target weight. The combination which will be sought will be the one whose sum is equal or closest to this set target weight.

The control unit 5 has the following construction. There is provided a selection signal generator 7 which, upon receiving a start signal a from an externally located packing device, periodically generates a selection signal b which is delivered to the multiplexer 3 to select the outputs of the weighing machines 1, 1 ... in numerical order. A combinatorial adder 8 adds combinations of digital values, which are indicative of the values weighed by the weighing machines 1, 1 ..., obtained from the A/D converter 4. A storage unit 9 having three storage areas A, B, C is adapted to store the results of the addition operations. A combinatorial subtracter 10 is adapted to perform a subtraction operation based on the results of said addition operation stored in the areas A, B, C of the storage unit 9, using a set target value $A_o$ which enters from the weight setting unit 6. A weight differential memory 11 stores the result of the subtraction operation, which will be zero or the value closest to zero within the calculated weight differential. A combination memory 12 stores the particular combination. A comparator 13 is adapted to compare the weight differential stored in the weight differential memory 11 and the current output of the combinatorial subtracter 10. If the current output is smaller, the comparator 13 sends a store signal e to the weight differential memory 11 to store said output (namely the result of the instant subtraction operation) in said memory, and to the combination memory 12 to store the instant combination.

Figure 3:
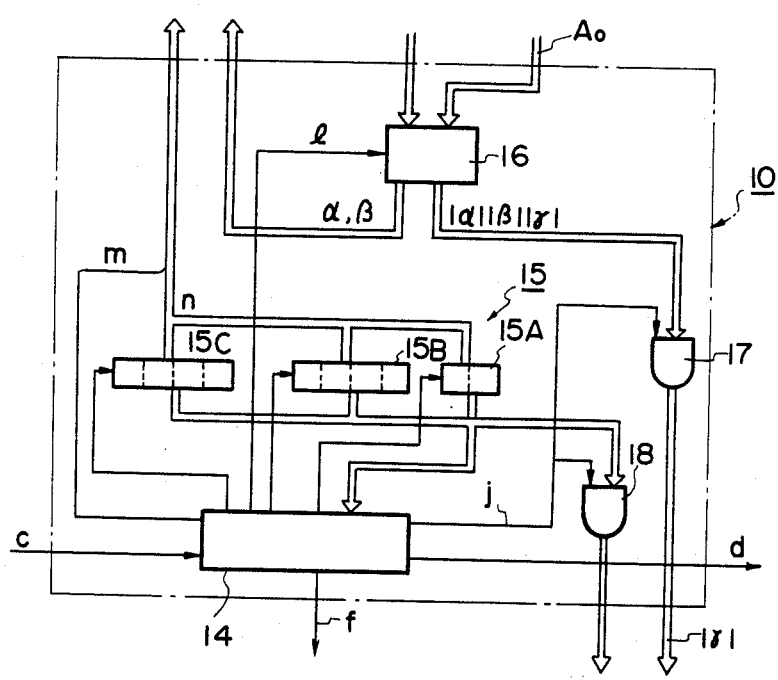
FIG. 3 is a block diagram of a combinatorial subtracting unit 10 illustrated in FIG. 2.
Figure 4:
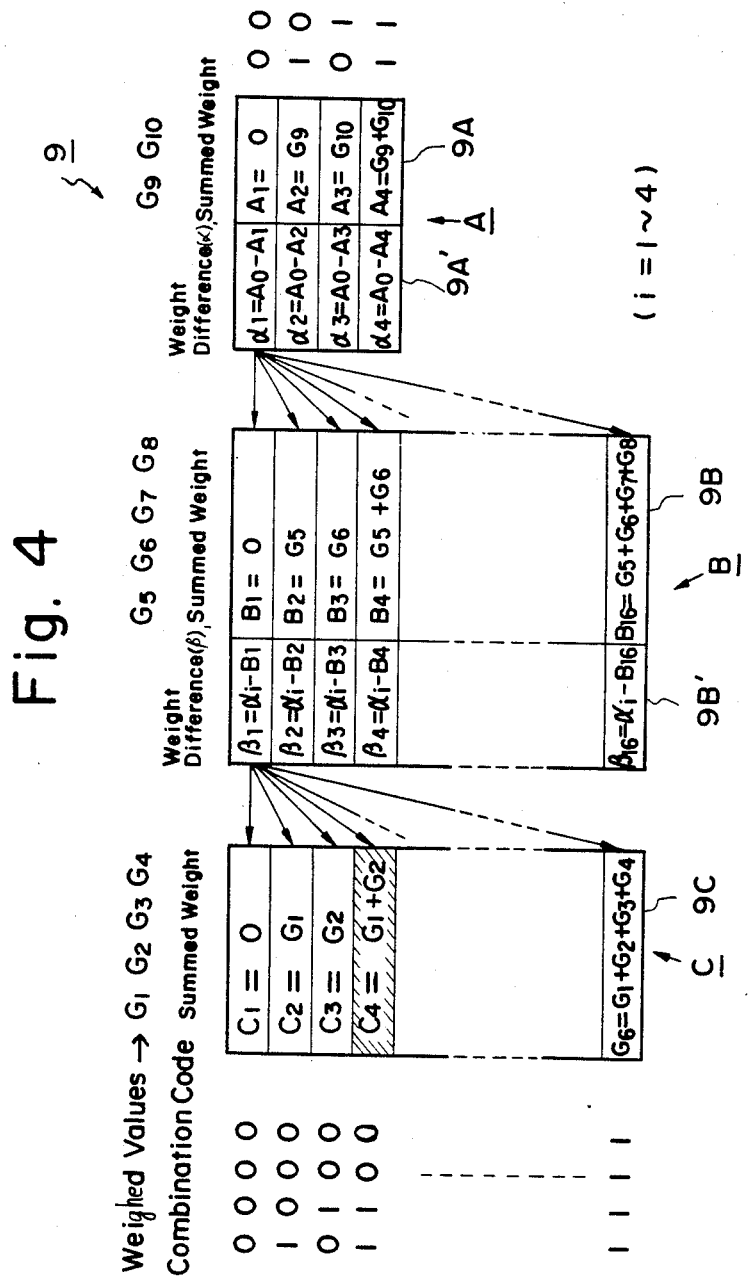
FIG. 4 is an illustrative view showing the data stored in a storage unit 9 illustrated in FIG. 2.

FIG. 4 shows an example of the configuration of the storage unit 9. It will be seen that the storage unit 9 has three storage areas A, B and C. It will be described in detail hereinbelow that the values weighed by the weighing machines 1, 1, ..., of which there are ten in number, are divided into three groups. The storage areas A, B and C correspond to these three groups. If the three groups of weighed values are denoted by $G_1$ through $G_4$, $G_5$ through $G_8$, and $G_9$ and $G_{10}$ (which will be referred to also as the third, second and first groups, respectively), then storage area A will correspond to the first group $G_9$ and $G_{10}$, B will correspond to the second group $G_5$ through $G_8$, and C will correspond to the third group $G_1$ through $G_4$. Each storage area is adapted to store the results of adding all combinations of weighed values which belong to the corresponding group, with these results being stored sequentially combination by combination. Furthermore, since the first group comprises the two weighed values $G_9$, $G_{10}$, a total of $2^2=4$ weight combinations are possible. If we let the first bit of a binary code correspond to $G_9$ and let the second bit correspond to $G_{10}$, then four combination codes are possible, namely 00, 10, 01 and 11. Moreover, since the second and third groups each comprise the four weighed values $G_5$ through $G_8$ and $G_1$ through $G_4$, respectively, a total of $2^4=16$ weight combinations are possible in each group. Letting the first, second, third and fourth bits correspond to $G_5$, $G_6$, $G_7$, $G_8$ in storage area B and to $G_1$, $G_2$, $G_3$, $G_4$ in storage area C, respectively, 16 combination codes will be possible in each case, the codes being 0000, 1000, 0100, 1100, ..., 0111, 1111. Each storage area also is adapted to store the above-mentioned results with a corresponding relationship being established between the combination codes and addresses. For example, stored at the third (=1100) address of the storage area C is the result $C_4(=G_1+G_2)$ of the addition based on the combination of weights $G_1$ and $G_2$ indicated by the combination code 1100. The portions of storage areas A and B that store the summed weight combinations resulting from the addition operations are referred to as memory blocks 9A and 9B, respectively. The storage areas A and B further include memory blocks 9A', 9B' corresponding to 9A and 9B, respectively. Memory block 9A' stores the weight differences $\alpha_i$ (where i is 1, 2, 3 or 4) obtained by subtracting the summed weights for each of the combinations of $G_9$, $G_{10}$ from the set target weight $A_o$, and memory block 9B' stores the weight differences $\beta_{1-16}$ obtained by subtracting the summed weights for each of the combinations of $G_5$ through $G_8$ from the above weight differences $\alpha_i$. The results of the addition operations performed for each group by the combinatorial adder 8 are written into the respective storage area A, B or C sequentially at addresses corresponding to the combination codes. When the combinatorial subtractor 10 issues a combination code signal n or the like, the stored additive combination is read out of the storage area, and the weight difference $\alpha_i$ or $\beta i$ which is the result of the subtraction operation is written into the storage area at the address corresponding to the combination code n. The combinatorial subtractor 10 may have the structure shown in FIG. 3.

In FIG. 3, a subtraction controller 14 controls the overall operation of the combinatorial subtracter 10. A code generating counter 15 generates a code n for selecting the additive combination to be subtracted, and is composed of three counters, namely a first counter 15A, second counter 15B, and third counter 15C corresponding to the three storages areas A, B and C of the storage unit 9 as shown in FIG. 2, each one of these counters being controlled individually by the subtraction controller 14. The arrangement is such that the subtraction controller 14 selects only one of the three counter outputs for delivery to the storage unit 9 at any one time. The reason for constructing the code generating counter 15 of the three counters 15A, 15B, 15C will now be explained.

If the counter 15 were to be composed of a single ten bit counter, then its content could be counted up only one step at a time starting from the least significant bit. By dividing the counter into the three counters 15A, 15B, 15C, however, each counter can be caused to count in order to make possible changes of +16 or +256 in addition to +1. Furthermore, since the counters 15A, 15B, 15C correspond to the respective storage areas A, B, C, these can be conrolled individually.

A subtracter 16 performs a subtraction operation which is controlled by a subtraction command signal l from the subtraction controller 14. The subtracter 16 produces the weight differences $\alpha$, as well as the absolute values $|\alpha|$ thereof, by subtracting the summed weight combinations $A_{1-4}$ of the first group, stored in storage unit 9, from the set value $A_o$ entered by the weight setting unit 6. The subtracter 16 stores these values temporarily in the storage unit 9, reads the values out of the storage unit, and subtracts from them the summed weight combinations $B_{1-16}$ of the second group to obtain the weight differences $\beta$ as well as the absolute values $|\beta|$ thereof. The subtracter 16 likewise stores the value $\beta$ temporarily in the storage unit 9, reads the values out of the storage unit, and subtracts from them the summed weight combinations $C_{1-16}$ of the third group to obtain the absolute values $|\gamma|$ of the weight differences.

AND gates 17, 18 are controlled by the subtraction controller 14. These AND gates 17, 18 are rendered conductive upon the arrival of an ON signal j which is produced whenever the absolute value $|\gamma|$ of a weight difference is delivered by the subtracter 16. AND gate 17 delivers the absolute value $|\gamma|$ of the weight difference to the comparator 13 and weight differential memory 11 of FIG. 2, and AND gate 18 provides the combination memory 12 with the combination code that gives the absolute value $|\gamma|$, the code being generated by the counter 15 as previously described.

The apparatus shown in FIGS. 2 and 3 performs a combinatorial weighing operation in the following manner.

Figure 6:
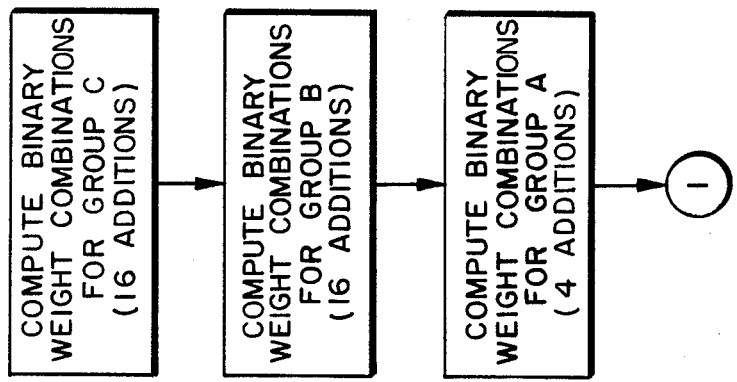
FIG. 6 is a flowchart of the addition operations used in the first and second embodiments.

First, the target weight $A_o$ is set using the weight setting unit 6. At this time each of the weighing machines 1, 1 . . . receives a supply of the articles from respective ones of the feeders 2, 2 . . . and then proceeds to weigh the articles. The weighed values enter the analog multiplexer 3 in the form of analog quantities. The selection signal generator 7, upon receiving a start signal a from the packing machine, indicating that a packing operation is ready to begin, periodically sends the multiplexer 3 the selection signal b. The signal b selects the outputs of the weighing machines 1, 1, . . . , namely the measured weight values, one after another in numerical order until all of the measured weight values are delivered to the combinatorial adder 8 through the A/D converter 4. The adder 8 temporarily stores all of the digital weight values received from the A/D converter 4, forms combinations among these values and sums the weights in each combination. Specifically, ten of the weighing machines 1, 1 . . . are provided, and the machines are divided into a group A of two machines, a group B of four machines, and a group C of four machines, as described above. The combinatorial adder 8 is adapted to produce additive combinations within each one of these groups as illustrated in FIG. 6. Thus, $2^2=4$ weight combinations are possible in group A, and $2^4=16$ are possible in each of groups B and C. The adder 8 calculates the sum of each combination in each group in numerical order, and sequentially stores the results in storage areas A, B and C (for groups A, B and C, respectively) of the storage unit 9, in such a manner that there is a given corresponding relationship between each particular address and combination code. When all additive combinations have been computed, the adder 8 sends an addition end signal c to the combinatorial subtracter 10 which then executes a subtraction operation.

The subtraction controller 14 of the subtracter 10 responds to the addition end signal c by providing the combination code generating counter 15 with a clear signal that clears the counters 15A, 15B, 15C to all zeros, by providing the subtracter 16 with the subtraction command signal l, and by providing the storage unit 9 with a read command signal m. The storage unit 9 responds to the signal m by supplying the subtracter 16 with the summed weight combination that is stored at the address which corresponds to the combination code signal n produced by the combination code generating counter 15. The subtractor 16 then takes these summed weight combinations, namely $A_{1-4}$, $B_{1-16}$, $C_{1-16}$, and subtracts them one after another from the set value $A_o$ which enters from the weight setting unit 6. This subtraction operation may take place in the following manner.

First, the summed weight combinations $A_{1-4}$ stored respectively at the first through fourth addresses of the memory block 9A in storage area A, are subtracted successively from the set value $A_o$. The results $\alpha_i$ ($=A_o-A_i$, where i=1, 2, 3, 4) are stored sequentially at the first fourth addresses of the memory block 9A' of storage area A. Next, summed weight combinations $B_1$ through $B_{16}$ stored at the first through 16th addresses of memory block 9b in storage area B, are subtracted successively from the result $\alpha_1$. The results $\beta_j$ ($=\alpha_1-B_j$, where j=1, 2, ..., 16) are stored sequentially at the first through 16th addresses of the memory block 9B' in storage area B. From the results $\beta_j$ the first result $\beta_1$ is taken from this is subtracted the summed weight combination $C_1$ stored at the first address of the memory block 9C. The result ($\beta=\gamma_1-C_1$) is delivered as the absolute value $|\gamma|$ to the comparator 13 and weight differential memory 11 through the AND gate 17 which will have been opened by the ON signal j produced by the subtraction controller 14. Since the absolute value $|\gamma|$ is the first input to the comparator 13, no other data is yet available for comparison. Accordingly, the subtraction controller 14 sends a store signal d to the weight differential memory 11 and combination memory 12. The memory 11 therefore stores the absolute value unconditionally, while the instant combination code produced by the combination code generating counter 15 is delivered by the AND gate 18 for storage in the combination memory 12.

Next, the summed weight combination $C_2$ stored at the second address of the memory block 9C in storage region C is subtracted from the weight difference $\beta_1$ stored at the first address of the memory block 9B' in storage region B. The resulting absolute value $|\gamma|$ is sent to the comparator 13 and weight differential memory 11 in the manner described above. The comparator 13 now compares the value previously stored in the weight differential memory 11 with the instant absolute value $|\gamma|$ that has just arrived. When the instant absolute value is the smaller of the two inputs to the comparator, the comparator sends the store signal e to the weight differential memory 11 and combination memory 12 which respond by storing the instant absolute value $|\gamma|$ as well as the corresponding combination code, respectively. When the instant absolute value $|\gamma|$ is larger, however, the comparator 13 does not respond, so that the data stored in memories 11 and 12 remain unchanged.

Next, the summed weight combinations $C_3$ stored at the third address of the memory block 9C in storage area C is subtracted from the weight difference $\beta_1$ stored in the memory block 9B' of storage area B, and the resulting absolute value $|\gamma|$ is processed in the manner described above, with the contents of memories 11 and 12 being updated in accordance with the output of the comparator 13. This sequence of operations is repeated by subtracting the summed weight combinations $C_{4-16}$ stored in the memory block 9C of storage area C successively from the weight differences $\beta_1$, the memories 11, 12 being updated after each step in accordance with the output of the comparator 13.

When the calculations involving $\beta_1$ are completed, the summed weight combinations $C_{1-16}$ stored in the memory block 9C of storage area C are subtracted successively from the weight difference $\beta_2$ stored at the second address of the memory block 9B' in storage area B. The results $|\gamma|$ are delivered to the comparator 13 as previously described, and the memories 11, 12 are again updated in accordance with the output of the comparator 13.

The foregoing is repeated until all of the summed weight combinations $C_1$ through $C_{16}$ stored in the memory block 9C of the storage area C have been subtracted from each and all of the weight differences $\beta_{1-16}$ stored in the memory block 9B' of the storage area B. When such has been completed, the summed weight combinations $B_{1-16}$ stored in the memory block 9B of the storage area B are successively subtracted from the weight difference $\alpha_2$ stored at the second address of the memory block 9A in storage area A. The results $\beta_j$ ($=\alpha_2-B_j$, where j=1, 2, ..., 16) are written one after another into the memory block 9B' of storage area B. Then, in the manner described above, the summed weight combinations $C_{1-16}$ stored at the respective addresses of memory block 9C in storage area C are successively subtracted from each and all of the newly written weight differences $\beta_{1-16}$ stored in the memory block 9B' in connection with $\alpha_2$. All of the 256 (16×16) results $|\gamma|$ are delivered to the comparator 13 and weight differential memory 11 one at a time, the later having its content updated in accordance with the output of the comparator, as already described. In this fashion the smallest weight difference $|\gamma|$, and the combination code which gives this weight difference, will be stored in the weight differential memory 11 and combination memroy 12, respectively.

When the foregoing calculations involving $\alpha_2$ are completed, the summed weight combinations $B_{1-16}$ stored in the memory block 9B are subtracted successively from the weight difference $\alpha_3$ stored at the third address of the memory block 9A, and the results are stored in the memory block 9B'. Thereafter, the summed weight combinations $C_{1-16}$ stored in the memory block 9C are subtracted from each and all of these results. The 256 (16×16) values which are obtained are sent to the comparator 13 and weight differential memory 11 one at a time, the latter again having its content updated in accordance with the output of the comparator.

When the foregoing calculations involving $\alpha_3$ are completed, the same series of subtraction operations between the summed weight combinations $B_{1-16}$ and $C_{1-16}$ are carried out for the weight difference $\alpha_4$ which is stored at the fourth address of the memory block 9A. The 256 results $|\delta|$ of the 256 subtraction operations are fed sequentially to the comparator 13 and weight differential memory 11, the comparator comparing each arriving value with that stored in the memory 11.

Thus it will be seen that the subtraction operation involving the set value $A_o$ is executed on the basis of all combinations of the summed weight combinations $A_{1-4}$, $B_{1-16}$, $C_{1-16}$ in their entirety, giving a total of 1024 (16×16×4) results $|\delta|$. The smallest of these results $|\delta|$ will be left in the weight differential memory 11, and the content of the combination memory 12 at such time will be the combination code of the combination that gives this result.

Figure 7:
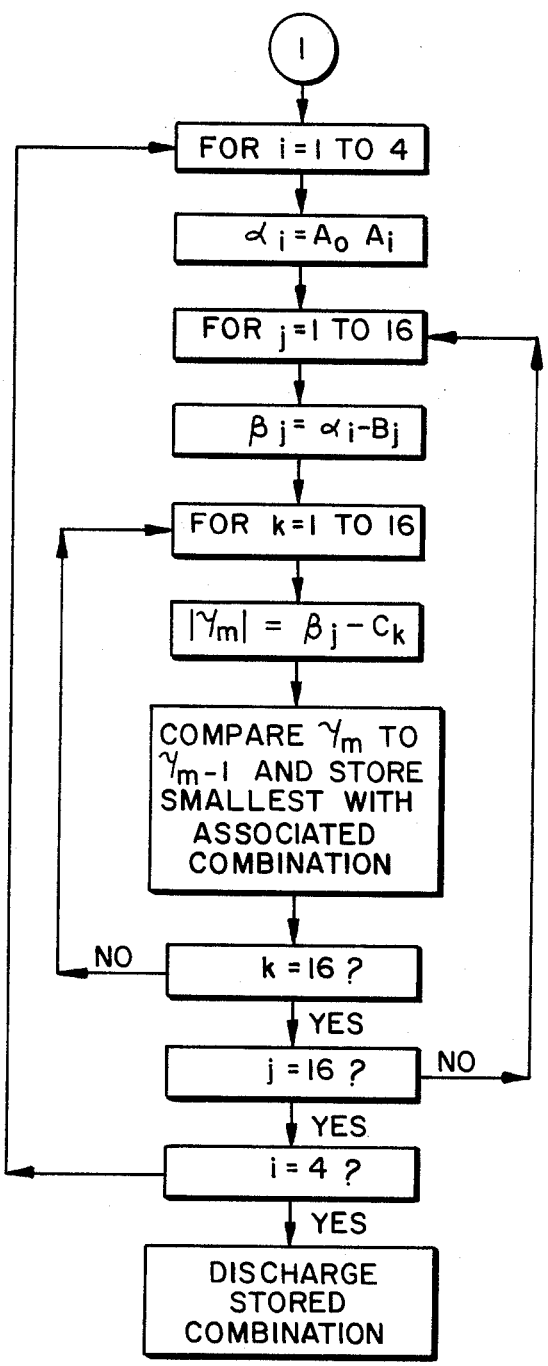
FIG. 7 is a flowchart of the subtraction and comparison operations used to determine the weight combination in the first embodiment.

When the subtraction controller 14 completes the subtraction operation described above, it delivers a subtraction end signal f to the combination memory 12, causing the memory to issue a discharge signal g in the form of the combination code which it stores. The signal g will actuate only those weighing machines 1, 1 ... indicated by the combination code, in response to which the weighing machines will discharge their contents into the common chute. Thus the combination of weighing machines that gives a value equal or closest to the set weight $A_o$ will be actuated and will discharge their contents. The articles so discharged are then sent to a packing machine for packing. The operations discussed above are illustrated in compact form in FIG. 7.

The weighing machines 1, 1, ... that have discharged their contents send a discharge end signal h to the corresponding feeders 2, 2, ... which respond by supplying the empty weighing machines with articles. This completes one combinatorial weighing cycle. The apparatus now stands by for the next start signal a from the packing apparatus. When the signal arrives at the selection signal generator 7, indicating that the packing machine can receive a new load, the series of addition and subtraction operations described above are resumed so that the next combinatorial weighing cycle may be carried out.

The method of adding combination according to the first embodiment of the present invention requires only 36 ($=2^2+2^4+2^4$) additions when ten weighing machines are used, whereas the conventional method requires 1023 additions ($=2^{10}-1$). Thus there is a large reduction in the total number of additions and, hence, a reduction in computation time.

Furthermore, when the results $\alpha$, $\beta$ are computed according to the first embodiment, such results are delivered solely to the storage unit 9, with the AND gates 17, 18 being held closed. This does not permits the absolute values $|\alpha|$, $|\beta|$ of these results to enter the comparator 13 and weight differential memory 11. It should be noted, however, that the absolute values $|\alpha|$, $|\beta|$ can be delivered to the comparator 13 when the results $\alpha$, $\beta$ are computed, so that the comparator or may compare $|\alpha|$, $|\beta|$ with the contents of the weight differential memory 11. In such case the AND gates 17, 18 would be deleted from the circuit.

The first embodiment of the present invention described hereinabove is arranged merely to decrease the number of combinatory additions needed to weigh articles. However, it is possible also to diminish the number of combinatory subtractions performed on the summed weight combinations for a particular set value if an additional condition is imposed upon the sought combination, namely that the combination give a sum which is not less than the set value, or which is within a certain range of values that bracket the set value. The second embodiment of the present invention which will now be described is for the former case, namely where the condition is that a combination be found whose sum is equal to or closest to the set target weight without being less than said target weight.

Figure 5:
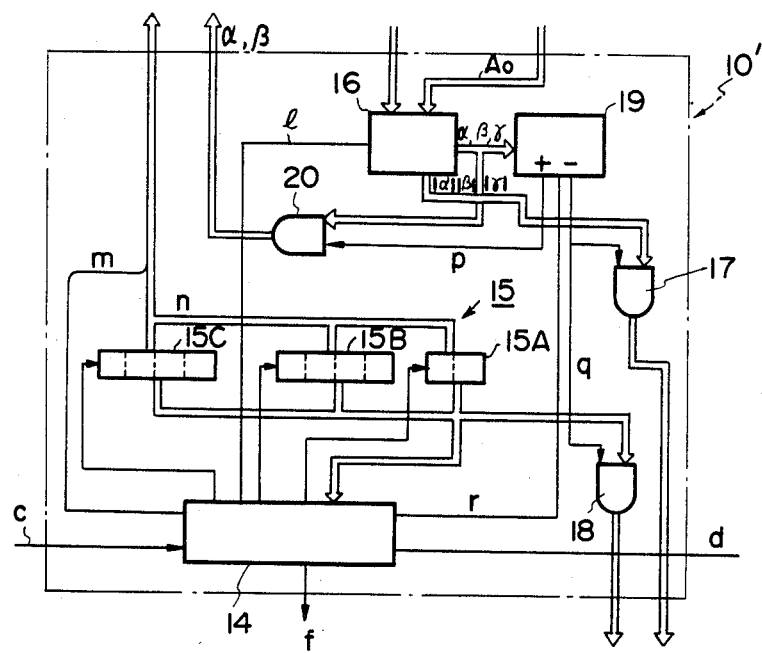
FIG. 5 is a block diagram illustrating another embodiment of the combinatorial subtracting unit 10 illustrated in FIG. 2.

The combinatorial subtractor for realizing the second embodiment of the present invention is denoted by numeral 10' in FIG. 5 and replaces the earlier described combinatorial subtracter 10 shown in FIG. 3. The arrangement of FIG. 5 differs from that of FIG. 3 in the provision of a discriminator 19 for discriminating the result of a subtraction operation, and an AND gate 20. The discriminator 19 discriminates whether the result of the subtraction is positive or negative, delivers the result of the discrimination operation, and controls the subtraction controller 14. More specifically, as will be described in further detail below, the discriminator 19 discriminates the polarity of weight differences $\alpha_{1-4}$ obtained by subtracting each of the summed weight combinations $A_{1-4}$ from the set weight $A_o$, of weight differences $\beta_{1-16}$ found by subtracting the summed weight combinations $A_{1-4}$ and $B_{1-16}$ from the set weight $A_o$, and of weight differences $\gamma_{1-16}$ obtained by subtracting the summed weight combinations $A_{1-4}$, $B_{1-16}$ and $C_{1-16}$ from the set weight $A_o$. Furthermore, the discriminator 19 issues a positive signal P (logical "1") when the result of a subtraction is positive, a negative signal q (logical "0") when the result of a subtraction is zero or negative, and a discrimination signal r whenever a polarity discrimination operation is carried out, the signal r being sent to the subtraction controller 14. The positive signal P is employed as a control signal which opens the AND gate 20 provided for controlling the output from the subtracter 16 to the storage unit 9. The negative signal q is employed as a control signal for opening the AND gate 17 which controls the output from the subtracter 16 to the weight differential memory 11 and to the comparator 13, and for opening the AND gate 18 which controls the output from the code generating counter 15 to the combination memory 12. The discrimination signal r is fed to the subtraction controller 14 which responds by causing the code generating counter 15 to produce the combination code which is necessary for the next combinatory subtraction operation.

The operation of the second embodiment will now be described in conjunction with FIGS. 2 and 5.

As already described in connection with the first embodiment, each of the weighing machines 1, 1 ... performs a weighing operation and sends the value weighed to the multiplexer 3. The addition operations performed on the measured values begin in response to the start signal a from the packing machine, and the resulting summed weight combinations $A_{1-4}$, $B_{1-16}$, $C_{1-16}$ are written into the respective storage areas A, B, C of the storage unit 9 where they are retained. When the combinatorial adder 8 sends the addition end signal C to the subtraction controller 14 of the combinatorial subtractor 10', a conditional combinatory subtraction operation is executed in the following manner.

First, the subtraction control circuit 14 sends a clear signal to the code generating counter 15 to clear all three of the counters 15A, 15B, 15C. Next, the subtraction controller 14, while counting up the counters 15A, 15B, 15C. one at a time in suitable fashion, selects a predetermined one of the counters and delivers its counted value as a combination code signal n to the storage unit 9 along with a read command signal m. The summed weight combination stored at the address designated by the combination code n is sent from the storage unit 9 to the subtracter 16. Further, the subtraction controller 14 sends the subtraction command signal l to the subtracter 16 which responds by subtracting the summed weight combination, delivered by the storage unit 9, from the set target weight $A_o$. This is performed sequentially for each summed weight combination that arrives.

The subtraction operation in this embodiment is performed in accordance with a method which differs from that employed by the combinatorial subtracter 10 of the first embodiment. That is, with the subtracter 10 of the first embodiment as illustrated in FIG. 3, the subtraction operations are executed sequentially in a branched flow for all summed weight combinations from one group to another. With the subtracter 10' of this embodiment, however, as illustrated in FIG. 5, each group is ranked, and the subtraction operations are executed in a branched flow from the higher to the lower ranking groups, and each result of a subtraction is investigated to determine whether it is positive or not. When the result is not positive (i.e., is negative or zero), subtractions for combinations in the group ranked below the group that gave the negative or zero result are omitted.

In accordance with the subtraction method of the second embodiment, then, the first step is to subtract the summed weight combination $A_1$, stored at the first address of the memory block 9A, from the set target weight $A_0$. When the result $\alpha_1$ ($=A_0-A_1$) is negative or zero, the discriminator 19 issues the negative signal q and the discrimination signal r, so that the absolute value of the result $\alpha_1$ is sent to the weight differential memory 11 and the comparator 13 through the AND gate 17. Since the absolute value $|\alpha_1|$ is the first signal to arrive, it is written into the weight differential memory 11 unconditionally. Moreover, the particular combination for this value is written into the combination memory 12 unconditionally through the AND gate 18. This completes the subtraction processing for the summed weight combination $A_1$. Since the result $\alpha_1$ was negative or zero with respect to $A_1$, the next combinatory subtraction is performed using the next summed weight combination within the group of the same rank, that is, using the summed weight combination $A_2$ in the first group. If the result $\alpha_1$ had been positive, however, the discriminator 19 would have issued the positive signal p, rather than the negative signal q, along with the discrimination signal r. When such is the case (the positive case), the signal p opens the AND gate 20 to write the result $\alpha_1$ into the first address of the memory block 9A' in the storage area A of the storage unit 9. Now the subtracter 16 subtracts the summed weight combination $B_1$, stored at the first address of the memory block 9B in storage area B, from the previous result $\alpha_1$. The discriminator 19 discriminates the polarity of the result $\beta_1$ ($=\alpha_1=B_1$). When $\beta_1$ is negative or zero, its absolute value $|\beta_1|$ is sent to the weight differential memory 11 and to comparator 13 through the AND gate 17, as described above. Since this is the first signal to arrive (because we are assuming that $\alpha_1$ was positive), it is written into the weight differential memory 11 unconditionally, while the code for this particular combination is stored in the combination memory 12. This completes the subtraction processing using the result $\beta_1$. Since the result $\beta_1$ was negative or zero, subtraction processing shifts to the next summed weight combination within the group of the same rank, that is, to $B_2$ in the second group. Thus, the summed weight combination $B_2$ is subtracted from the weight difference $\alpha_1$ to give the result $\beta_2$. If the result $\beta_1$ had been positive, however, the discriminator 19 would have issued the positive signal p to open the AND gate 20, thereby writing $\beta_1$ into the storage area B of storage unit 9 at the first address of memory block 9B'. When such is the case, the subtracter 16 subtracts the summed weight combination $C_1$, stored at the first address of memory block 9C in storage area C, from the result $\beta_1$ The discriminator 19 now discriminates whether the result $\gamma_1$ ($=\beta_1-C_1$) is positive or negative. When $\gamma_1$ is negative or zero, its absolute value $|\gamma|$ is sent to the weight differential memory 11 and the comparator 13 through the AND gate 17. Since this is the first signal to arrive (again because we are assuming that $\beta_1$ was positive), it is written into the weight differential memory 11 unconditionally, while the code for this particular combination is stored in the combination memory 12. Subtraction processing then shifts to the next summed weight combination within the group of the same rank, namely to $C_2$ in the third group.

When the discriminator 19 detects that a result $\alpha$, $\beta$, or $\gamma$ is negative or zero and, hence, delivers the negative signal q, the comparator 13 responds by comparing the weight difference previously stored in the weight differential memory 11, with the absolute value $|\alpha|$, $|\beta|$, or $|\gamma|$ of the instant result $\alpha$, $\beta$, or $\gamma$. If the instant absolute value $|\alpha|$, $|\beta|$, or $|\gamma|$ is smaller than the value stored in the memory 11, only then is the instant absolute value stored in the memory 11 and the corresponding combination code in the memory 12. Thus the memories 11, 12 are updated only when the instant absolute value is smaller than the stored value.

Let us now return to the result $\gamma_1$, which was assumed to be negative or zero in the foregoing discussion. It was mentioned that subtraction processing shifts to the summed weight combination $C_2$. Since this group of combination is the lowest ranked, however, subtraction processing shifts to the combination $C_2$ even when the result $\gamma_1$ is positive. When such is the case, however, no updating of the memories 11, 12 takes place. Thus, the subtracter 16 subtracts the summed weight combination $C_2$, stored at the second address of the memory block 9C of storage area C, from the result $\beta_1$ ($=\alpha_1-B_1$) which was written into the memory block 9B' at the first address thereof. This gives the result $\gamma_2$ ($=\beta_1-C_2$). The discriminator 19 now discriminates the polarity of $\gamma_2$. If it is negative or zero, then the disciminator 19 issues the negative signal q, permitting the AND gate 17 to deliver the absolute value $|\gamma_2|$ of this result to the weight differential memory 11 and the comparator 13. Since this is the first signal to arrive the absolute value $|\gamma_2|$ is stored in the weight differential memory 11 unconditionally, and the corresponding combination code is stored in the combination memory 12. These subtraction and comparison operations are executed sequentially in similar fashion for the summed weight combinations $C_{3-16}$ stored at the third through 16th addresses of the memory block 9C, with respect to the result $\beta_1$ ($=\alpha_1-B_1$) stored at the first address of the memory block 9B'.

Figure 8A:
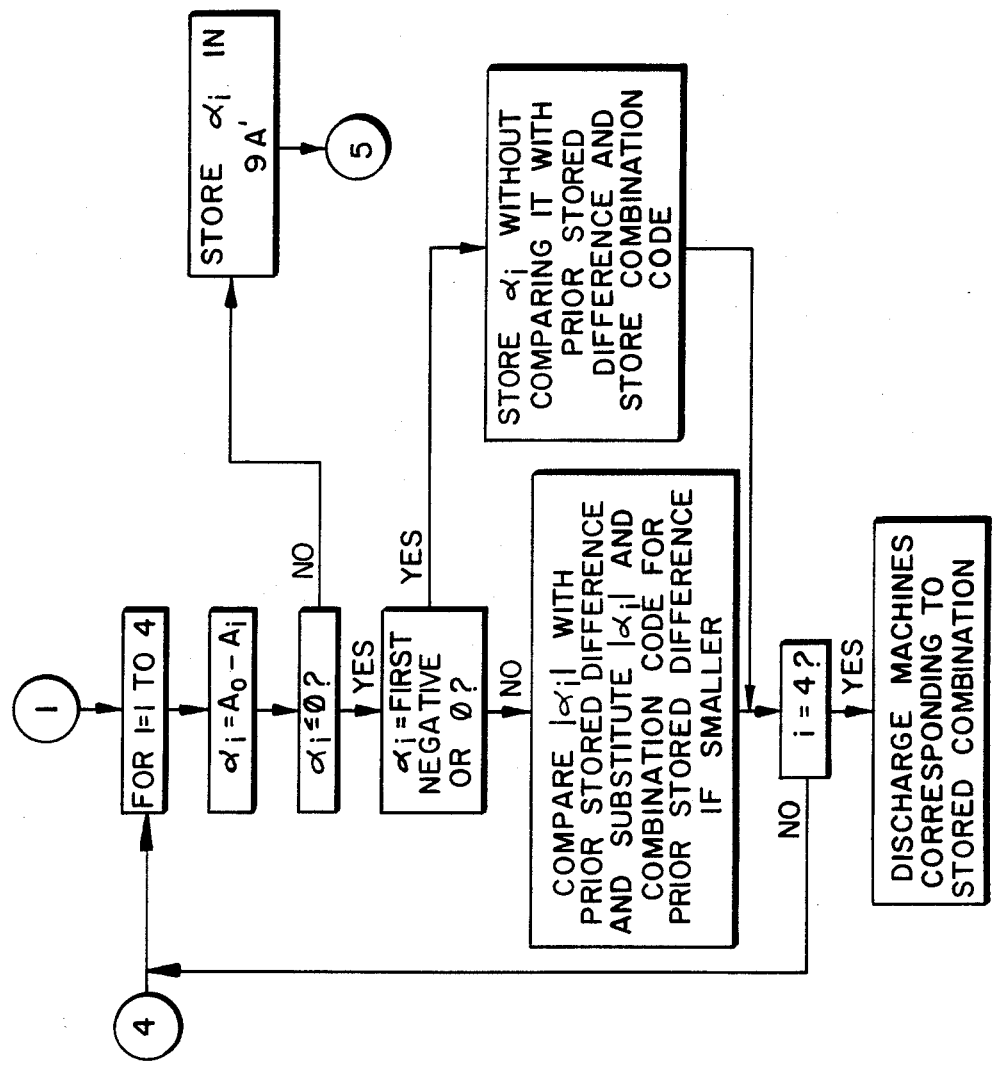
FIGS. 8A-8C are flowcharts of the subtraction and comparison operations used to determine the weight combination in the second embodiment.
Figure 8B:
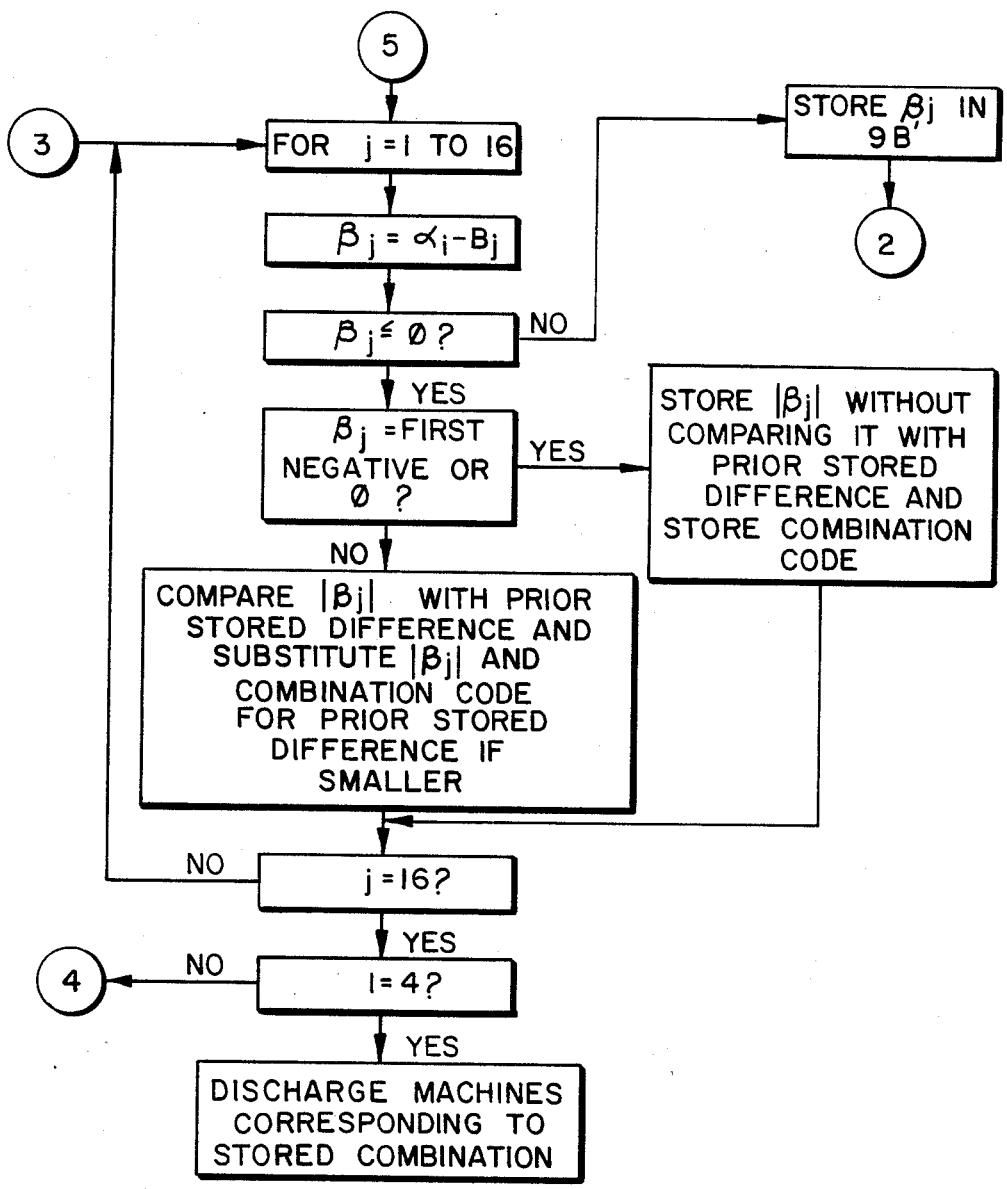
Figure 8C:
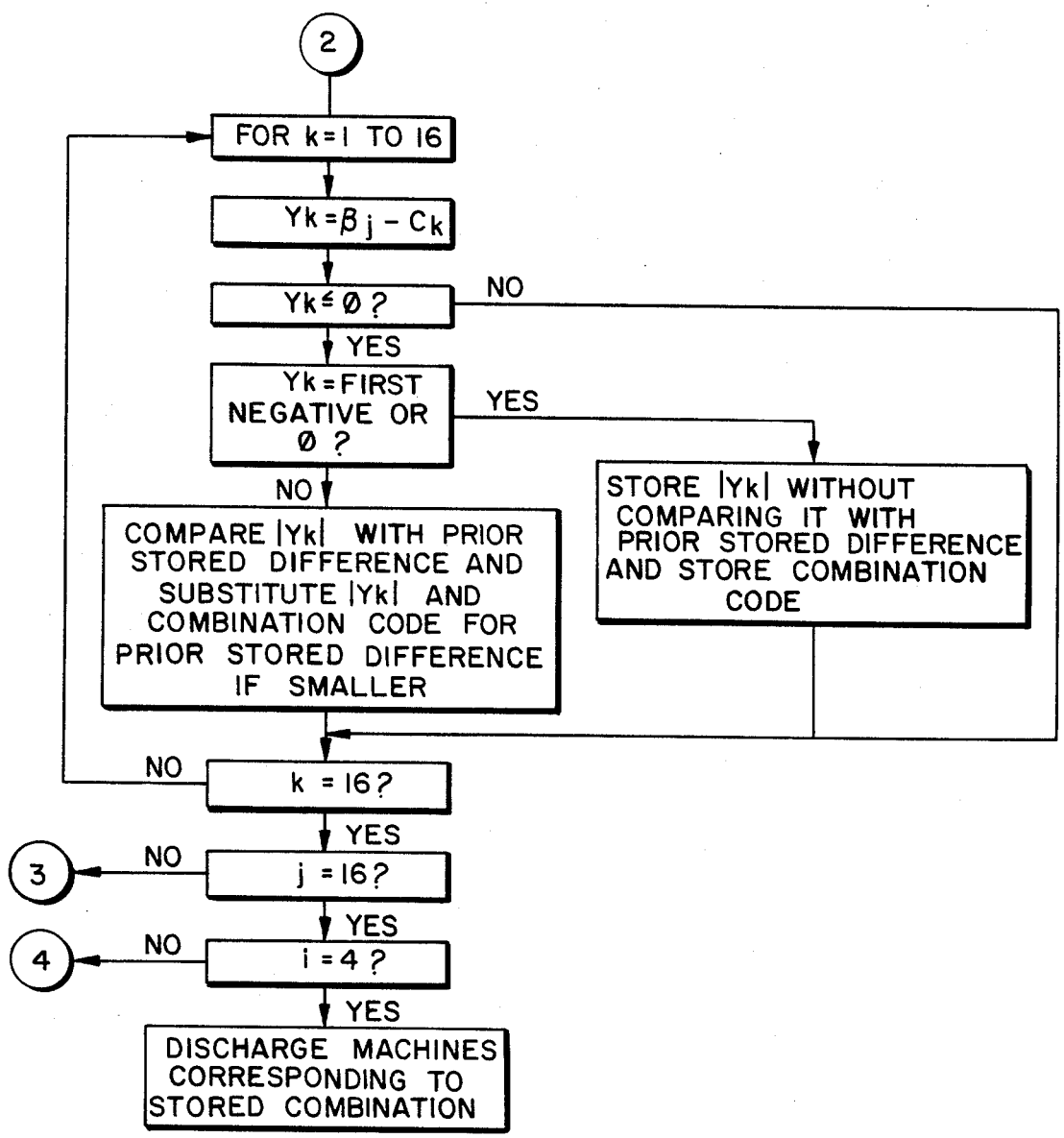

Upon completion of subtraction and comparison processing through the summed weight combination $C_{16}$, the subtraction operation using the result $\beta_1$ ends, so that processing now branches to the next summed weight combination within the group of the same rank. In other words, the subtracter 16 now subtracts the summed weight combination $B_2$, stored at the second address of the memory block 9B, from the weight difference $\alpha_1$ which is stored at the first address of the memory block 9A'. The discriminator 19 discriminates the polarity of the result $\beta_2$ ($=\alpha_1-B_2$), with $\beta_2$ being subjected to the same subtraction and discriminating operations as the result $\beta_1$. When $\beta_2$ itself is negative or zero, or after all of the stored summed weight combinations $C_{1-16}$ have been subtracted from $\beta_2$, that branch of the combinatory subtraction processing based upon $\beta_2$ ends, and processing shifts to the next summed weight combination within the group of the same rank. Hence, the subtracter 16 subtracts the summed weight combination $B_3$, stored at the third address of the memory block 9B, from the weight difference $\alpha_1$ stored at the first address of the memory block 9A'. Thereafter, all of the summed weight combinations $B_{3-16}$ stored in the memory block 9B are subtracted from the weight difference $\alpha_1$ stored at the first address of the memory 9A'. When any of the results $\beta_{3-16}$ is positive, all of the summed weight combinations $C_{1-16}$ stored in the memory block 9C are subtracted sequentially from that particular result, as described above. That ends the branch of the combinatory subtraction processing based on the result $\alpha_1$, so that processing shifts to the next summed weight combination within the group of the same rank. Thus, the summed weight combination $A_2$ stored at the second address of the main block A is subtracted from the set target weight $A_o$ by the subtracter 16, and the polarity of the result $\alpha_2$ ($=A_0-A_2$) is discriminated. When $\alpha_2$ is negative or zero, its absolute value $|\alpha_2|$ is delivered to the weight differential memroy 11 and the comparator 13. The comparator compares the instant absolute value $|=_2|$ with the weight difference previously stored in the memory 11, and updates the memory 11 when $|\alpha_2|$ is the smaller of the two. This completes the branch of subtraction processing based on the result $\alpha_2$, so that processing now shifts to the next summed weight combination within the group of the same rank. When $\alpha_2$ is positive, however, the branch of processing based on $\alpha_2$ continues. That is, the discriminator 19 issues the positive signal p, whereby AND gate 20 is opened to write the result $\alpha_2$ into the second address of the memory block 9A'. This is followed by the subtraction of the summed weight combinations $B_{1-16}$, stored in the memory block 9B, from the result $\alpha_2$, giving the results $\beta_{1-16}$. When any of the results $\beta_{1-16}$ is positive, the summed weight combinations $C_{1-16}$ stored in the memory block 9C are subtracted sequentially from that particular result, thereby completing the series of subtraction operations based on $\alpha_2$. Processing then shifts to the branch based on the next summed weight combination within the group of the same rank. Thus, the summed weight combination $A_3$ stored at the third address of the memory block 9A is subtracted from the set target weight $A_o$. The polarity of the result $\alpha_3$ ($=A_o-A_3$) is discriminator 19. When $\alpha_3$ is positive, processing proceeds in the same manner as described in connection with $\alpha_1$ and $\alpha_2$ when they were positive. When subraction processing based on $\alpha_3$ is completed, processing shifts to the next summed weight combination within the group of the same rank, so that now $\alpha_4=A_o-A_4$ is computed. When the result $\alpha_4$ is positive, this branch of combinatory subtraction is pursued. When it has been completed, the full series of combinatory subtraction operations ends. At such time the content of the weight differential memory 11 will be the smallest weight differential obtained from the combinatory subtraction operations, and the content of the combination memory 12 will be the combination code of the combination that gives said smallest weight difference. The weight of the stored combination will be equal or closest to the set target weight, without being less than the target weight. The subtraction controller 14 then sends the subtraction end signal f to the combination memory 12, whose stored combination code is coupled to the weighing machines 1, 1 . . . as the discharge signal g. As a result, the articles in those weighing machines 1, 1, . . . designated by the combination code are released into the packing machine, and the weighing machines which have been emptied send discharge end signals h to the respective feeders 2, 2, . . . to receive a fresh supply of the articles. The weighing machines 1, 1, . . . then await a start signal a from the packing machine in order to begin the next weighing cycle. The operations discussed above are illustrated in compact form in FIGS. 8A-8C.

In the second embodiment of the present invention, the condition imposed upon the subtraction operations is that the final result not be less than the set target weight. An alternative condition can be that the final result lie within a certain range of values which bracket the set target weight, such as within plus or minus ten grams of the target weight. For such an arrangement the discriminator 19 would be designed to issue not the signal q indicative of a negative value, but a signal q would indicate when the result $\alpha$, $\beta$, or $\gamma$ is within prescribed upper and lower limits. When such is the case, the signal would open the AND gates 17, 18. When the result $\alpha$, $\beta$, or $\gamma$ exceeds the upper limit, the discriminator 19 would issue an upper limit signal p to open the AND gate 20. When the result $\alpha$, $\beta$, or $\gamma$ is below the lower limit, neither the signal q nor p would be produced, so that the AND gates 17, 18, 20 would remain closed.

In the first and second embodiments as described above, a combinatory weighing operation is performed to find a combination of articles whose summed weight is equal or closest to the set target weight. A similar operation can be performed to execute a combinatory counting process to find a combination of articles whose summed number is equal or closest to a set target number. This can be achieved by dividing the digital weight quantities obtained from the A/D converter 4 by the weight of an individual article to convert the summed weight of the articles into the number of articles. (For example, if the weight of an individual article is 2 grams and the weight measured by a weighing machine is 600 grams, the number of articles is found by dividing 600 grams by 2 grams, giving 300 as the result). The result is applied to the combinatorial adder 8 which functions as described hereinabove. The combinations added, however, are article numbers rather than weights.

Furthermore, in the first and second embodiments, the ten weighing machines 1, 1, . . . have their measured values $G_1$, $G_2$, . . . $G_{10}$ divided into three groups according to the ratio 2:4:4. However, the number of weighing machines and the dividing ratio can be set as desired. It is obvious that the number of combinatory additions will differ depending upon the dividing ratio. In addition, it has been described that the number of measured values is equal to the number of weighing machine. By using one or several of the weighing machines to perform several weighing operations each, however, the number of measured values can be made to exceed the number of weighing machines, and these values can be divided into groups and then added combinatorially as described above.

It has also been described that four summed weight combinations are stored in storage area A, 16 in storage area B, and 16 in storage area C, for a total of 36 summed weight combinations. Since the summed weight combinations $A_1$, $B_1$, $C_1$ are zero, however, these can be omitted, and zeros can be stored unconditionally in their place. This would make the number of addition operations equal to 33. Alternatively, rather than storing the zero summed weight combinations, the combinatory subtraction operations based on the zero summed weight combinations can be omitted to further diminish the number of computations.

In the first and second embodiments, the subtraction sequence for the combinatory subtraction operations shifts from storage area A to storage area B, and then from storage area B to storage area C, while counting proceeds from the first address to the last address in each storage area. This is only one of the possible sequences, however, for the shift can be from area B to area C, and then from area C to area A, by way of example.

It should be noted that while the combinatory addition and subtraction operations are executed after the analog quantities provided by the weighing machines are converted into digital quantities, it can be so arranged that processing is executed using the analog quantities without conversion. In such case the A/D converter 4 and analog multiplexer 3 would be unnecessary, and the addition and subtraction operations would be performed in analog fashion.

Thus, in accordance with the present invention as described in connection with the first and second embodiments thereof, a plurality of weight values obtained by weighing a plurality of articles, or a plurality of discrete values found from the weight values, are divided into several groups, and all possible combinations within each group are added. The results of these combinatory addition operations are subtracted from a set target value to obtain the combination which is equal to closest to the set target value. In accordance with the invention, therefore, the number of combinatory addition operations can be reduced by a very wide margin, with a substantial reduction in computation time.

Further, in the second embodiment of the present invention, the groups of summed combinations obtained by the method of the first embodiment are ranked, and the summed combinations are subtracted sequentially, starting from the highest ranking group and proceeding to the lowest ranking group, from the set target value, trying all combinations until the result of a subtraction operation satisfies a predetermined condition. From that point onward subtraction operations involving with lower ranking groups are omitted. This provides the combination which gives a result equal or closest to the set target value, and which at the same time satisfies the predetermined condition. This permits a decrease in both the number of combinatory addition and subtraction operations so that an even greater reduction in computation time can be achieved.

The apparatus for practicing the combinatorial weighing or counting method of the present invention includes the weighing machines for weighing the articles, means for dividing the weight values obtained from the weighing machines, or the discrete values found from the weight values, into several groups, and for adding the combinations within each group, storage means for storing the results of the combinatory addition operations, combinatory subtraction means for subtracting the results of the combinatory addition operations from the set target value, and means for finding the combination that gives the smallest error when the sum of said combination is subtracted from the set target value. Such an arrangement diminishes the number of addition operations, or the number of addition and subtraction operations, to shorten the computation time. The result is a combinatorial weighing or counting apparatus with a greatly enhanced weighing or counting performance.

In summary, therefore, the present invention divides the plurality of weight values, or the plurality of discrete values found from the weight values, into several groups, adds the combinations within each group, and stores the summed combinations in the storage unit 9. In the prior art, however, the weight values or discrete values are not divided into groups, so that all possible combinations must be added and all results stored, with the combination that gives the value equal or closest to the set target value being found from the stored results. With the present invention, therefore, the storage unit 9 need not have a storage capacity as large as that required by the prior art.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing or counting method in which a plurality of articles are weighed to provide a plurality of weight values or count values, said values are combined, and the optimum combination of said values is found whose total value is equal or closest to a set target value, said method comprising:
   (a) dividing said plurality of weight values into a plurality of groups;
   (b) computing summed weight values for each group by adding the weight values in each and every combination of weight values that constitute said group;
   (c) finding every combination of the summed weight values, in which a single summed weight value, including a combination containing no weighed values resulting in a zero summed weight, is permitted, computing first group differences between said set target value and a total value obtained by adding the summed weight values in each and every combination of the summed weight values in the first group and using the first group differences in the next group of summed weighed values for computing next group differences; and
   (d) finding the optimum combination of weight values whose sum gives the smallest of the first and next group differences when subtracted from said set target value and discharging or counting the articles associated with the optimum.

2. A combinatorial weighing or counting method according to claim 1, wherein the step (d) comprises the steps of:
   (di) comparing the difference, each time it is computed, with the smallest difference computed previously;
   (dii) storing the smaller of the two compared differences as well as the combination of weight values that gives said smaller difference; and
   (diii) executing said comparison step and said storage step for all combinations of weight values.

3. A combinatorial weighing or counting method according to claim 1 or claim 2, wherein the step (b) comprises the steps of:
   (bi) expressing all $2^n$ combinations of weight values in each group in the form of binary n-bit combination codes by establishing a correspondence between each weight value $G_i$ (where $i=1, 2, \ldots, n$) and the i-th bit of a binary n-bit number, where one group of weight values is composed of n-number of weight values $G_l$ through $G_n$;

(bii) computing summed weight values on the basis of the combination indicated by said combination codes; and (biii) establishing a corresponding relationship between the combination codes and the addresses of memory means where said summed weight values are stored.

4. A combinatorial weighing or counting method according to claim 1 or claim 2, further comprising the step of computing the number of articles by dividing the weight of said articles by the weight of an individual article, whereby said weight values are converted into discrete article numbers and said set target value is converted into a set target number.

5. A combinatorial weighing or counting method in which a plurality of articles are weighed to provide a plurality of weight values or count values, said values are combined, and the optimum combination of said weight values or count values is found whose sum is equal or closest to a set target value within a predetermined range, said method comprising:

(a) dividing said plurality of weight values into n-number of groups (where n is a positive integer greater than or equal to 2) and ranking said groups into first, second, . . . ,n-th groups;

(b) computing summed weight values for each group by adding the weight values in each and every combination of weight values that constitute said group;

(c) computing every combination of the summed weight value, in which at least a single summed weight value, including a combination containing no weighed values resulting in a zero summed weight, is permitted from the first group to the i-th group (where i=1, 2, 3 . . . n-1), computing first group differences between said set target value and a total value obtained by adding the summed weight values in each and every combination of the summed weight values in the first group and using the first group differences in the n+1th group of summed weighed values for computing n+1th group differences;

(d) determining whether each said difference is within said predetermined range;

(e) comparing, when each said difference is within said predetermined range, said difference with the smallest difference previously computed, wherein further weight combinations including the summed weight values of the combination providing said difference are regarded as not providing the optimum combination and are not compared;

(f) storing the smaller of the two compared differences as well as the combination of weight values that gives said smallest difference; and (g) treating the combination of weight values whose total value gives the smallest difference when subtracted from said set target weight, as the optimum combination of all possible combinations and discharging or counting the articles associated with the optimum combination.

6. A combinatorial weighing or counting method according to claim 5, wherein the step (b) comprises the steps of:

(bi) expressing all $2^m$ combinations of weight values in each group in the form of binary m-bit combination codes by establishing a correspondence between each weight value $G_1$ (where i=1, 2, . . . ,m) and the i-th bit of a binary m-bit number, where one group of weight values is composed of m-number of weight values $G_l$ through $G_m$;

(bii) computing summed weight values on the basis of the combinations indicated by said combination codes; and (biii) establishing a corresponding relationship between the combination codes and the addresses of memory means where said summed weight values are stored.

7. A combinatorial weighing or counting method according to claim 5 or claim 6, further comprising the step of computing the number of articles by dividing the weight of said articles by the weight of an individual article, whereby said weight values are converted into discrete article numbers and said set target value is converted into a set target number.

8. A combinatorial weighing or counting apparatus in which a plurality of articles are weighed by weighing machines to provide a plurality of weight values or count values, said values are combined, and the optimum combination of said values is found whose sum is equal or closest to a set target weight, said apparatus comprising:

first computation means for dividing said plurality of weight values into a plurality of groups and for computing summed weight values for each group by adding the weight values in each and every combination of weight values that comprise said group including a combination that contains no weighed values that results in a zero summed weight;

first memory means for storing said summed weight values;

means for generating all combination codes for said summed weight values from each of said groups;

second computation means for computing first group differences between said set target value and a total value obtained by adding the summed weight values in each and every combination of the summed weight values in the first group and for using the first group differences in the next group of summed weighed values for computing next group differences; and means for selecting the combination of summed weight values whose sum gives the smallest of the differences when subtracted from said set target value.

9. A combinatorial weighing or counting apparatus according to claim 8, wherein said means for selecting the combination of summed weight values whose sum gives the smallest difference comprises:

comparison means for comparing the difference, each time it is computed, with the smallest difference previously computed; and second memory means for storing the smaller of the two compared differences as the minimum difference, and for storing the combination of summed weight values that gives said minimum difference.

10. A combinatorial weighing or counting apparatus according to claim 8 or claim 9, further comprising third computation means for computing the number of articles by dividing the weight of said articles by the weight of an individual article, whereby said weight values are converted into discrete article numbers.

11. A combinatorial weighing or counting apparatus in which a plurality of articles are weighed by weighing machines to provide a plurality of weight values or count values, said values are combined, and the optimum combination of said values is found whose sum is equal or closest to a set target value within a predetermined range, which apparatus comprises:

first computation means for dividing said plurality of weight values into n-number of groups (where n is a positive integer greater than or equal to 2) and for computing summed weight values for each group by adding the weight values in each and every combination of weight values that comprise said group including a combination that contains no weight values and results in a zero summed weight;

first memory means for storing said summed weight values;

means for generating all combination codes for said summed weight values from each of said groups from the first group through i-th group (where i=1, 2, . . ., n−1);

second computation means for computing nth group differences between said set target value and a total value obtained by adding the summed weight values in each and every combination of summed weight values in the nth group and using the nth group differences with the n+1th group of summed weighed values to obtain n+1th group differences;

discrimination means for discriminating whether said differences are within said predetermined range;

comparison means for comparing, when a difference is within said predetermined range, said difference with the smallest difference computed previously; and second memory means for storing the smaller of the two compared differences as the minimum difference and for storing the combination of the summed weight values that gives said minimum difference;

wherein, when said difference is within said predetermined range, said combination code generating means does not generate combination codes for further combinations including the summed weight values which comprise the combination providing said difference, these combinations of summed weight values being regarded as not providing the optimum combination and are not compared.

12. A combinatorial weighing or counting apparatus according to claim 11, further comprising third computation means for computing the number of articles by dividing the weight of said articles by the weight of an individual article, whereby said weight values are converted into discrete article numbers.

13. A combinatorial weighing method for weighing articles divided into numbered groups and for providing a total weight closest to a target weight, said method comprising:
(a) computing the combination sums in each numbered group for all combinations of weighted values including one combination in each numbered group where no weighed values are combined resulting in a zero value combination sum;
(b) subtracting the combination sums of the highest numbered group from the target weight resulting in highest group differences;
(c) subtracting the combination sums of the next lowest numbered group from each of the highest differences resulting in next highest group differences until all numbered groups have been subtracted;
(d) comparing the next highest group differences and the highest group differences and selecting the smallest difference as the combination of weighed values closest to the target weight; and
(e) discharging the combination of weighed articles.

14. A combinatorial weighing method for weighed articles divided into numbered groups and for providing a total weight closest to a target weight, said method comprising:
(a) computing the combination sums in each numbered group for all combinations of weighed values including one combination sum in each numbered group where no weighed values are combined resulting in a zero value combination sum;
(b) subtracting combination sums of the highest numbered group from the target weight resulting in highest group differences;
(c) determining whether each highest group difference is within a predetermined range;
(d) comparing each highest group difference with a prior difference and substituting the smaller as the prior difference if the difference is within the predetermined range;
(e) subtracting the combination sums of the next lowest numbered group from each highest group difference which is outside the predetermined range resulting in a next highest group difference;
(f) comparing each next highest group difference with the prior difference and substituting the smaller as the prior difference if the differences are within the predetermined range; and
(g) discharging the combination of weighed articles corresponding to the prior difference.

15. A method according to claim 14, wherein the predetermined range is from zero to less than zero.

* * * * *